United States Patent [19]

Böhm et al.

[11] 4,305,287

[45] Dec. 15, 1981

[54] APPARATUS FOR CONTROLLING ENERGY CONVERSION

[75] Inventors: Harold Böhm, Glashütten; Wolfgang Kempe, Mörfelden-Walldorf; Robert Fleischmann, Hosbach, all of Fed. Rep. of Germany

[73] Assignee: Licentia Patent-Verwaltungs-GmbH, Fed. Rep. of Germany

[21] Appl. No.: 148,600

[22] Filed: May 12, 1980

[30] Foreign Application Priority Data

May 12, 1979 [DE] Fed. Rep. of Germany ....... 2919273

[51] Int. Cl.³ ............ G01L 23/22

[52] U.S. Cl. ............ 73/346; 73/35; 73/362 SC; 123/425; 123/435; 338/22 SD

[58] Field of Search ............ 338/22 SD; 252/520, 252/519; 73/346, 362 SC, 35; 123/421, 435, 425

[56] References Cited

U.S. PATENT DOCUMENTS

| | | | |
|---|---|---|---|
| 2,616,859 | 11/1952 | Verweg | 252/519 X |
| 2,735,824 | 2/1956 | Haayman et al. | 252/520 |
| 2,786,819 | 3/1957 | Smith et al. | 252/519 |
| 3,832,668 | 8/1974 | Berman | 73/362 SC X |
| 4,164,867 | 8/1979 | Hickling et al. | 73/346 |

FOREIGN PATENT DOCUMENTS

| | | | |
|---|---|---|---|
| 52-38197 | 3/1977 | Japan | 338/22 SD |

*Primary Examiner*—Jerry W. Myracle

*Attorney, Agent, or Firm*—McGlew and Tuttle

[57] ABSTRACT

A method of controlling energy conversion through the thermal processes which take place in a working space of a machine comprises measuring the temperature of the process by means of a temperature sensor direction in the working space and supplying components and proportions thereof to the working space in amounts determined as a function of the temperature. A device for carrying out the method comprises a temperature sensor having a measuring element which is a sintered mixture of zirconium oxide and iron oxide.

5 Claims, 4 Drawing Figures

APPARATUS FOR CONTROLLING ENERGY CONVERSION

BACKGROUND AND FIELD OF THE INVENTION

The invention relates in general to energy conversion and in particular to an open-loop or closed-loop control of energy conversions through thermal processes in machines.

In the future, the form of human social life will be governed by an optimal use of the available energy. This particularly applies to the non-renewable resources of organic origin such as carbon and hydrocarbon compounds. Another future requirement on the utilization of these energy carriers for generating heat and kinetic energy will be to minimize the environmental pollution. The invention deals with these problems.

In the field of energy conversion, for example, from the above-mentioned energy carriers or from other, preferably gaseous substances such as hydrogen gas, in heat engines or thermal power machines, there is a tendency to carry out the involved oxidation processes with the energy carrier and the oxidizer in such a way as to achieve the theoretically possible optimum value of conversion. For example, with internal combustion engines it is known to determine the amount of fuel supplied in every combustion cycle as a function of outside conditions, such as the supplied air or the speed of the engine.

SUMMARY OF THE INVENTION

The invention is directed to a further optimation of thermal energy conversions in machines. In accordance with the invention mixture components and proportions are determined and provided in accordance with the temperature.

The fact that the temperature is measured directly in the working space of the internal combustion engine, makes it possible to determine and take into account, for example, even all of the outer limiting conditions for an optimum quantification and supply of the energy carrier and oxidizer, thus of the air-fuel mixture. For example, the operating temperature of the engine, cool at the start and at higher operating temperature later, and thereby also the determination of the mixture ratio are involved in the temperature measuring.

A variation of the mixture ratio may further take into account or eliminate unintentional results of conducted oxidation processes, such as the knocking of gasoline engines, which is accompanied by a characteristic temperature increase in the combustion space.

In internal combustion engines, it is also possible to control the ignition point of the mixture as a function of the measured temperature in the working space, thus to vary the limiting conditions of the energy conversion process.

The invention, however, is not limited to thermal power engines, it may advantageously be applied to any heat machines such as combustion furnaces with the objective of improving the mixture ratio of a gaseous energy carrier and an oxidizer to an optimum.

The temperature is measured by means of a ceramic temperature sensor covering a temperature range of about from room temperature to 1100° C. Another requirement satisfied by such a temperature sensor is that it determines the temperature and variations thereof quickly. Only this ensures the possibility of controlling the thermal process rapidly. Since the sensor operates within the working space, it must withstand the pressure and temperature variations therein for a long period of time. Such a temperature sensor is made of a mixture of ziconium oxide and iron oxide, with the mixture ratio of the two compounds being variable between one to 10 and 10 to 1, depending on the provided temperature range to be measured. This mixture is sintered to small pellets. To permit a later welding of electrical leads to the temperature sensor, another mixture ratio may be provided for the marginal zones of the measuring core to be sintered, which ratio is determined by the requirements of the welding process.

Accordingly, it is an object of the invention to provide a method of controlling energy conversion through thermal processes in a working space of a machine which comprises measuring the temperature of the process by means of a temperature sensor directly in the working space, and supplying the mixture components and proportions thereof to the working space in amounts determined as a function of the temperature which is measured.

A further object of the invention is to provide a temperature sensor for use in energy conversions which comprises a sintered mixture of ziconium oxide and iron oxide which are advantageously mixed in the ratio of from 1 to 10 or 10 to 1 depending on the provided temperature measuring range.

A further object of the invention is to provide a temperature sensor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
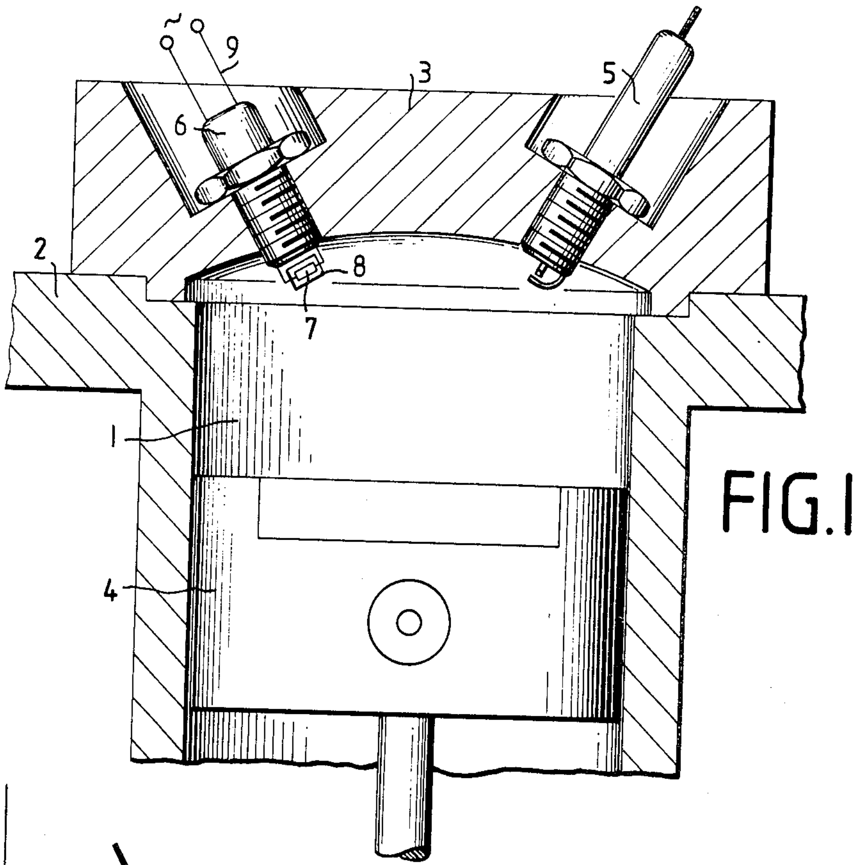
FIG. 1 is a diagrammatical showing of the working space of an internal combustion engine, where the energy is converted.

Referring to the drawings in particular the invention embodied therein, comprises a method of controlling the energy conversion through thermal processes in a working space such as a cylinder combustion space 1 of a machine such as internal combustion engine.

Figure 2:
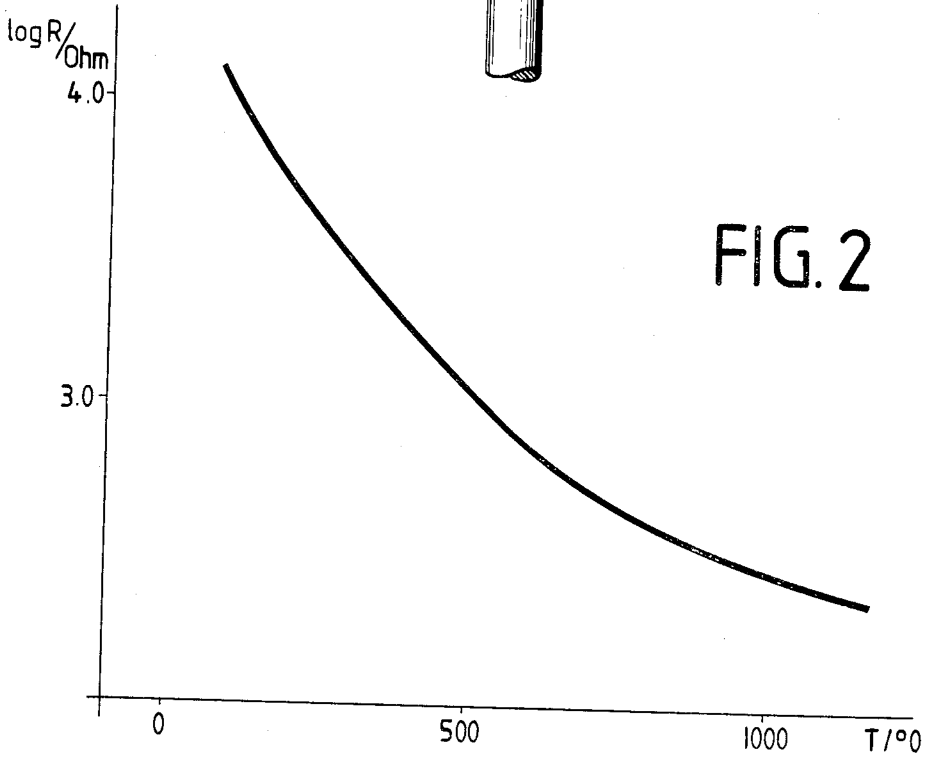
FIG. 2 shows the variation of the resistance of the temperature sensor as a function of the temperature.
Figure 3:
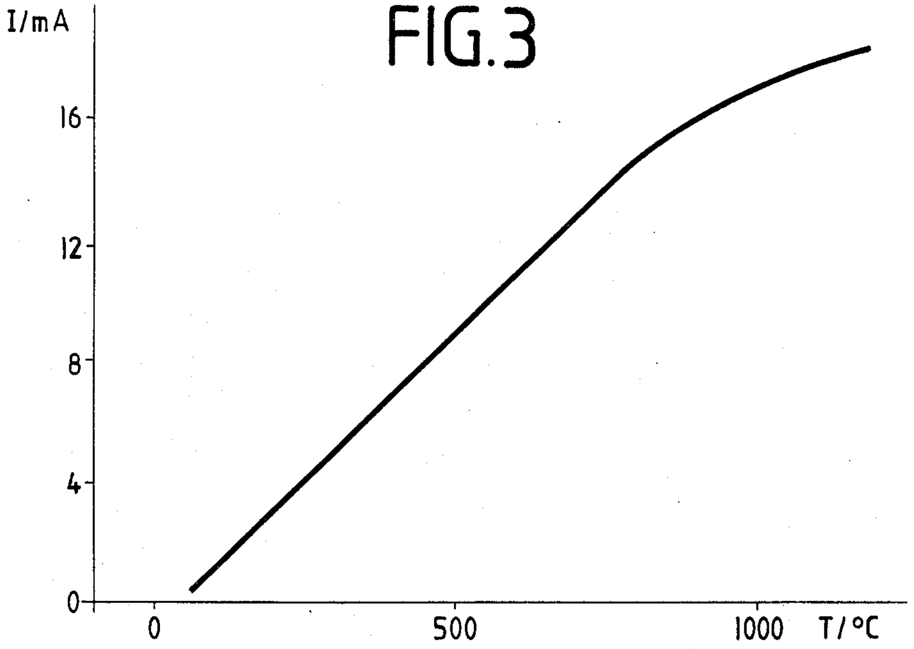
FIG. 3 shows the current through the temperature sensor as a function of the temperature.
Figure 4:
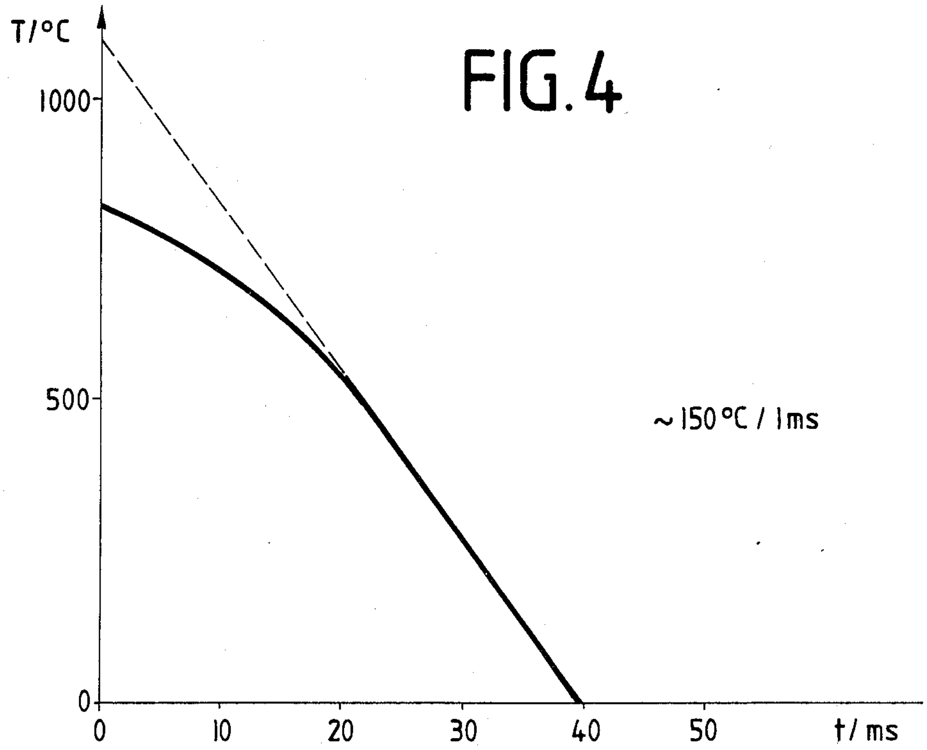
FIG. 4 is a temperature-time diagram illustrating the cooling process in the temperature sensor.

FIG. 1 shows a working space 1 of an internal combustion engine which is bounded by cylindrical walls 2, a cylinder head 3, and a movable working piston 4. Further shown is a spark plug 5. The temperature sensor 6 is secured in cylinder head 3 and it projects into working space 1. The measuring element 7 may be surrounded by a protective sleeve 8. The Electrical leads to measuring element 7 are shown at 9. It is possible, of course, to replace one of the leads by a ground connection. FIG. 2 illustrates the variations of the resistance of the temperature sensor as a function of the temperature, the scale or ordinates being logarithmic. Depending on this resistance variations, a certain current flows through the temperature sensor at a specific temperature, as shown in FIG. 3. The measuring sensor is connected in a constant AC circuit or a circuit with a constant AC power source. The diagram of FIG. 4 illustrates the response of the temperature sensor to a temperature variation. As shown, the sensor is capable of indicating a temperature variation of 1,000° C. within a time period of less than 50 milliseconds, and this property makes the sensor particularly suitable for being used in internal combustion machines.

The disclosed method makes it possible to control the combustion process in an internal combustion engine in an optimum manner, starting from the cold engine, by varying the air-fuel ratio from about 1 to 1, to about 1 to 16 under later conditions of operating temperature.

While specific embodiments of the invention have been shown and described in detail to illustrate the application of the principles of the invention, it will be understood that the invention may be embodied otherwise without departing from such principles.

What is claimed is:

1. A device for controlling energy conversion through thermal processes in the working space of a machine comprising a temperature sensor having a measuring element consisting essentially of a sintered mixture of zirconium oxide and iron oxide in a ratio between 1 to 10 and 10 to 1, for measuring a temperature in a temperature range in the working space of up to about 1100° C. to control the energy conversion, a marginal zone of the measuring element having a different mixture ratio which is compatible to welding and at least one electrical lead welded to the marginal zone.

2. A device according to claim 1, including means connected to said temperature sensor for varying at least one limiting condition of the thermal processes as a function of the measured temperature in the work space.

3. A device according to claim 2, wherein the machine comprises a combustion mechanism having ignition means for igniting a fuel and oxidizer mixture in the work space, the limiting condition comprising the instant at which said ignition means is activated to ignite the mixture in the working space.

4. A device according to claim 2, wherein the machine comprises a combustion mechanism for receiving a fuel and oxidizer mixture in the working space for ignition, said limiting condition comprising the proportions of the fuel and oxidizer in the mixture.

5. A device according to claim 4, wherein said means for varying the limiting condition comprises means for varying the proportions of fuel and oxidizer to approximate a theoretical complete oxidation of fuel.

* * * * *